United States Patent
Chou et al.

(10) Patent No.: US 12,045,108 B2
(45) Date of Patent: Jul. 23, 2024

(54) ADJUSTING POWER LIMIT IN ELECTRONIC APPARATUS BASED ON SELF-POWER CONSUMPTION TIME AVERAGES OF BATTERY

(71) Applicant: Acer Incorporated, New Taipei (TW)

(72) Inventors: Shuo-Jung Chou, New Taipei (TW); Chuan-Jung Wang, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 42 days.

(21) Appl. No.: 17/867,643

(22) Filed: Jul. 18, 2022

(65) Prior Publication Data
US 2023/0152870 A1    May 18, 2023

(30) Foreign Application Priority Data

Nov. 16, 2021    (TW) .................................. 110142626

(51) Int. Cl.
G06F 1/26    (2006.01)
G06F 1/3206    (2019.01)

(52) U.S. Cl.
CPC ............ *G06F 1/263* (2013.01); *G06F 1/3206* (2013.01)

(58) Field of Classification Search
None
See application file for complete search history.

(56) References Cited

U.S. PATENT DOCUMENTS

| | | | |
|---|---|---|---|
| 8,762,746 B1 * | 6/2014 | Lachwani | G06F 1/263 713/300 |
| 10,594,145 B1 * | 3/2020 | Wang | G01R 31/392 |
| 2015/0077127 A1 * | 3/2015 | Fu | G06F 1/3212 324/428 |
| 2017/0025871 A1 * | 1/2017 | Choi | H01M 10/425 |
| 2018/0366957 A1 * | 12/2018 | Hale | G01R 31/387 |
| 2019/0039467 A1 * | 2/2019 | Hortop | H02J 7/0071 |
| 2021/0135294 A1 * | 5/2021 | Mikhaylik | H02J 7/0069 |
| 2021/0226555 A1 | 7/2021 | Sohn et al. | |
| 2021/0281081 A1 * | 9/2021 | Singer | G01R 31/367 |
| 2023/0032997 A1 * | 2/2023 | Chou | H02J 7/00308 |

FOREIGN PATENT DOCUMENTS

| | | |
|---|---|---|
| CN | 112434463 | 3/2021 |
| TW | I470410 | 1/2015 |
| TW | 201924175 | 6/2019 |
| TW | I717882 | 2/2021 |
| TW | I720670 | 3/2021 |

\* cited by examiner

*Primary Examiner* — Danny Chan
(74) *Attorney, Agent, or Firm* — JCIPRNET

(57) ABSTRACT

An electronic apparatus and a load adjusting method thereof are provided. The method includes the following steps. Powering of an external power supply is detected. A self-power consumption time of the battery from a full capacity to a preset capacity is calculated and recorded when the powering of the external power supply is detected. A first average value of multiple self-power consumption times recorded within a preset period from a current time is calculated, and the first average value is compared with a second average value of the self-power consumption times of a previous preset period of the preset period. A value of a power limit for controlling the electronic apparatus to enter a load adjusting state is adjusted according to a comparison result.

8 Claims, 5 Drawing Sheets

ADJUSTING POWER LIMIT IN ELECTRONIC APPARATUS BASED ON SELF-POWER CONSUMPTION TIME AVERAGES OF BATTERY

CROSS-REFERENCE TO RELATED APPLICATION

This application claims the priority benefit of Taiwan application serial no. 110142626, filed on Nov. 16, 2021. The entirety of the above-mentioned patent application is hereby incorporated by reference herein and made a part of this specification.

BACKGROUND

Technical Field

This disclosure relates to an electronic apparatus and a power management method thereof, in particular to an electronic apparatus and a load adjusting method thereof.

Description of Related Art

In the laptop market, there is a growing demand for gaming models, which require higher performance and higher power consumption. Laptops have both AC and DC power supply architectures. Under AC power supply, the system can be fully loaded, while under DC power supply, due to the limitation of the battery specification, some power reduction mechanism must be used, i.e. throttling, to extend the operation time while maintaining the normal operation of the system.

However, under extreme conditions where the power difference between AC and DC is too large or the throttling is not large enough, the system may still not be able to react in time, resulting in the battery being forced into overcurrent protection after the AC adaptor is unplugged, thus causing the system to shut down instantaneously.

For example, FIG. 1 is a schematic diagram of a conventional electronic apparatus entering an overcurrent protection state. In a waveform diagram 10 shown in FIG. 1, waveform no. 1 is the system voltage, waveform no. 2 is the processor hot (Prochot) protection mechanism of hardware, waveform no. 3 is the processor hot protection mechanism of software, and waveform no. 4 is the system current. From the waveform changes in FIG. 1, it is found that during the moment when the AC adaptor is unplugged, the degree of power reduction generated by the protection mechanism of the hardware and software is not large enough, resulting in the system voltage dropping to 3.8V and the system power consumption is 0 (as shown in the waveform in block 12), making the system shut down directly without warning.

SUMMARY

An embodiment of the disclosure provides a load adjusting method of an electronic apparatus, applicable to an electronic apparatus with a processor and a battery. The method includes the following steps. Powering of an external power supply is detected. A self-power consumption time of the battery from a full capacity to a preset capacity is calculated and recorded when the powering of the external power supply is detected. A first average value of multiple self-power consumption times recorded within a preset period from a current time is calculated, and the first average value is compared with a second average value of the self-power consumption times of a previous preset period of the preset period. A value of a power limit for controlling the electronic apparatus to enter a load adjusting state is adjusted according to a comparison result.

An embodiment of the disclosure provides an electronic apparatus including a battery, a storage device, and a processor. The battery is configured to power the electronic apparatus. The storage device is configured to store computer programs. The processor is coupled to the battery and the storage device, and is configured to load and execute the computer programs to detect powering of an external power supply; calculate a self-power consumption time of the battery from a full capacity to a preset capacity and record the self-power consumption time in the storage device when the powering of the external power supply is detected; calculate a first average value of a plurality of self-power consumption times recorded within a preset period from a current time, and compare the first average value with a second average value of the self-power consumption times of a previous preset period of the preset period; and adjust a value of a power limit for controlling the electronic apparatus to enter a load adjusting state according to a comparison result.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments of the disclosure propose an electronic apparatus and a load adjusting method thereof. By calculating a self-power consumption time of a battery from a full capacity to a preset capacity during a period when the electronic apparatus is connected to AC power, using a simple moving average (SMA) method to obtain an average value of the self-power consumption time based on a preset period (e.g., one month), and automatically adjusting a system load when self-power consumption during the current preset period is reduced by a preset ratio compared with self-power consumption during a previous preset period, a system is ensured not go into overcurrent protection due to difference in power or energy saving when switching power, resulting in a direct shutdown of the system.

Figure 1:
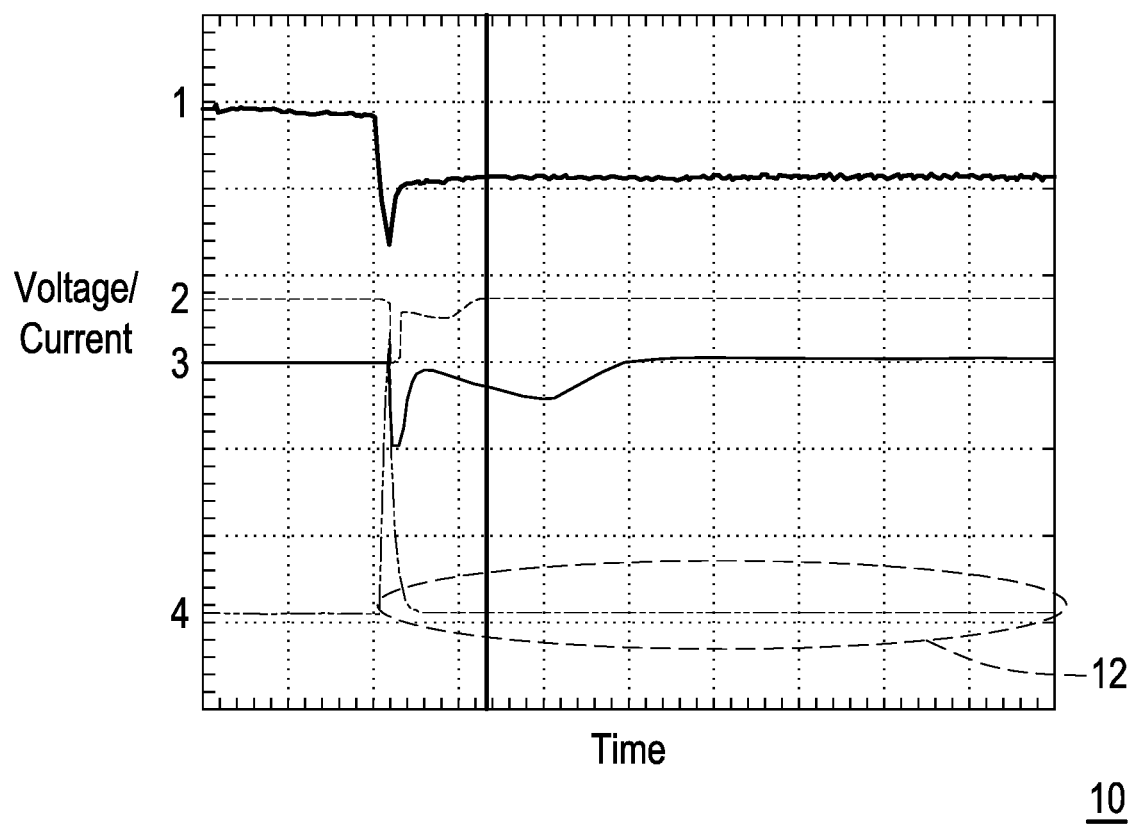
FIG. 1 is a schematic diagram of a conventional electronic apparatus entering an overcurrent protection state.
Figure 2:
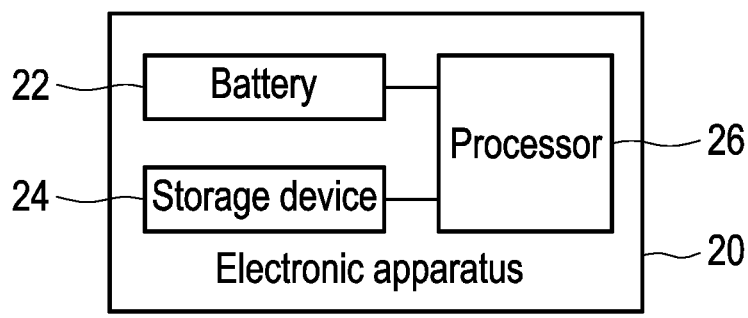
FIG. 2 is a block diagram of an electronic apparatus according to an embodiment of the disclosure.

FIG. 2 is a block diagram of an electronic apparatus according to an embodiment of the disclosure Referring to FIG. 2, an electronic apparatus 20 according to an embodiment of the disclosure is, for example, a computing device such as a laptop, a desktop computer, a server, a workstation, or a mobile device such as a cell phone or a tablet computer that has computing capabilities and supports alternating current (AC) and direct current (DC) power. The electronic apparatus 20 includes elements such as a battery 22, a storage device 24, and a processor 26, and functions of the elements are described as follows.

The battery 22 is, for example, formed by multiple battery cells connected in series. Types of the battery cells include lithium ion (Li-ion) batteries, nickel-metal hydride (Ni-MH) batteries, or lithium polymer (Li-polymer) batteries, but not limited thereto.

The storage device 24 is, for example, any type of fixed or removable random access memory (RAM), read-only memory (ROM), flash memory, hard disk or similar elements or a combination of the elements, and is configured to store computer programs that can be executed by the processor 26.

The processor 26 is, for example, a central processing unit (CPU), or other programmable general-purpose or special-purpose microprocessor, microcontroller, digital signal processor (DSP), programmable controller, application specific integrated circuit (ASIC), programmable logic device (PLD) or other similar devices or a combination of the devices, and the disclosure is not limited thereto. According to this embodiment, the processor 24 may load computer programs from the storage device 22 to execute the load adjusting method of the electronic apparatus according to the embodiment of the disclosure.

Figure 3:
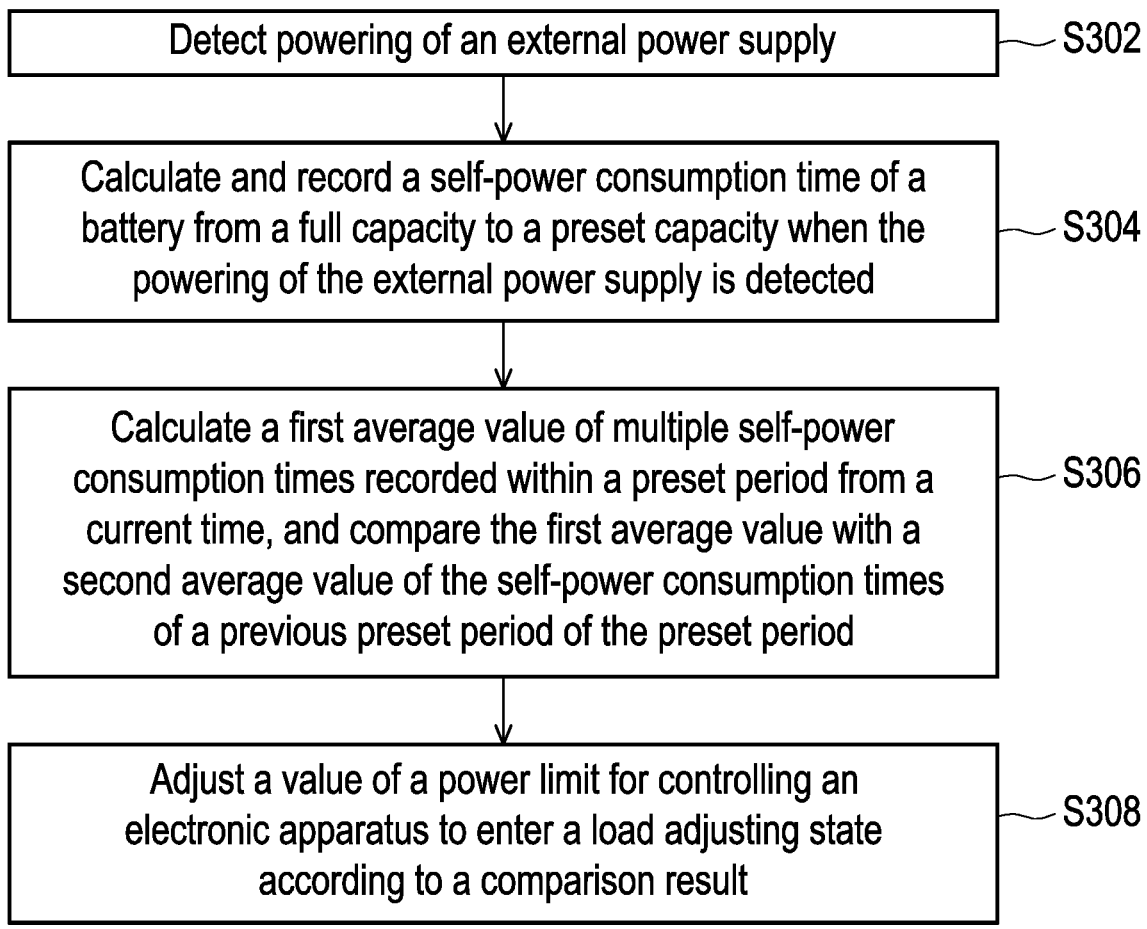
FIG. 3 is a flow chart of a load adjusting method of an electronic apparatus according to an embodiment of the disclosure.

FIG. 3 is a flow chart of a load adjusting method of an electronic apparatus according to an embodiment of the disclosure. Referring to FIG. 2 and FIG. 3 at the same time, the method according to this embodiment is applicable to the electronic apparatus 20. The following are the detailed steps of the load adjusting method of the electronic apparatus according to this embodiment with various elements of the electronic apparatus 20.

In step S302, in the electronic apparatus 20, the processor 26 detects powering of an external power supply. According to an embodiment, the external power supply is, for example, an AC adaptor, the electronic apparatus 20 is provided, for example, with a jack for connecting to the AC adaptor, and the processor 26 uses, for example, a detection pin in the jack to detect connection of the AC adaptor. When electric potential of the detection pin changes from high to low, the processor 26 may determine that the powering of the external power supply is detected. According to other embodiments, the electronic apparatus 20 may also use other methods (e.g., using a sensor) to detect the powering of the external power supply, and this embodiment does not limit its implementation.

Figure 4A:
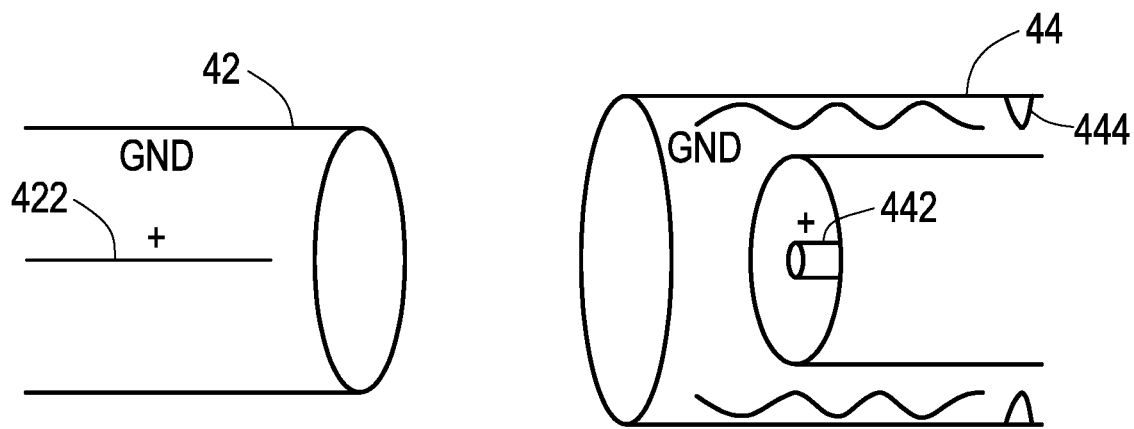
FIG. 4A and FIG. 4B are schematic diagrams of detecting powering of an AC adaptor according to an embodiment of the disclosure.
Figure 4B:
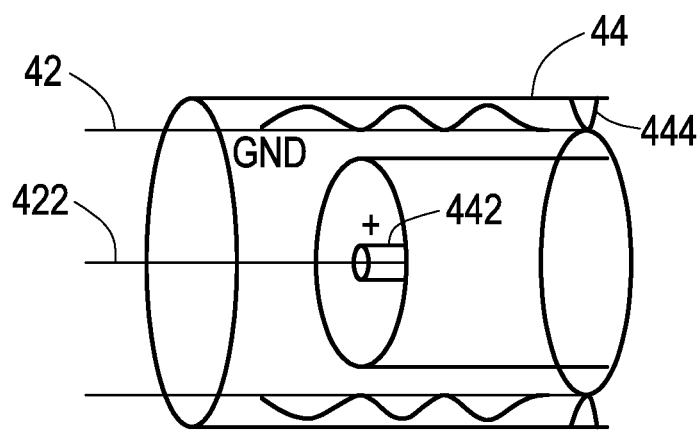

For example, FIG. 4A and FIG. 4B are schematic diagrams of detecting powering of an AC adaptor according to an embodiment of the disclosure. Referring to FIG. 4A, in a structure of the AC adaptor, a plug 42 of the AC adaptor includes a positive terminal 422 and a ground terminal GND, while a jack 44 on the electronic apparatus includes a positive terminal 442, a ground terminal GND, and a detection pin 444. When the plug 42 is plugged into the jack 44, as shown in FIG. 4B, the ground terminal GND of the plug 42 first contacts the ground terminal GND of the jack 44, then the positive terminal 422 of the plug 42 contacts the positive terminal 442 of the jack 44, and finally the ground terminal GND of the plug 42 contacts the detection pin 444 of the jack 44. When the plug 42 is not plugged into the jack 44, a signal of the detection pin 444 is high, and when the plug 42 is plugged into the jack 44, the signal of the detection pin 444 becomes low. With the above mechanism, the electronic apparatus may send a signal to the battery to inform a connection status of the AC adaptor according to a detection result of the detection pin 444.

In step S304, the processor 26 calculates and records a self-power consumption time of the battery 22 from a full capacity to a preset capacity when the powering of the external power supply is detected. The preset capacity is, for example, any value between 80% and 98% of the full capacity, but the embodiment is not limited thereto.

When powered by the external power supply, the battery 22 is charged by the external power supply, and stops charging when relative state of charge (RSOC) is 100%. In order to prevent the battery from being in a state of cyclic charging and discharging, the electronic apparatus is set, for example, with a recharge limit. That is, charging stops when the relative state of charge of the battery reaches 100%, and does not recharge until the relative state of charge drops to, for example, 95% of the preset capacity due to self-power consumption of the battery. Self-power consumption current of the battery varies with aging of the battery, and as internal resistance of the battery increases after aging, the self-power consumption time of the battery (i.e., the time from 100% to 95% of RSOC) becomes shorter and shorter.

Figure 5:
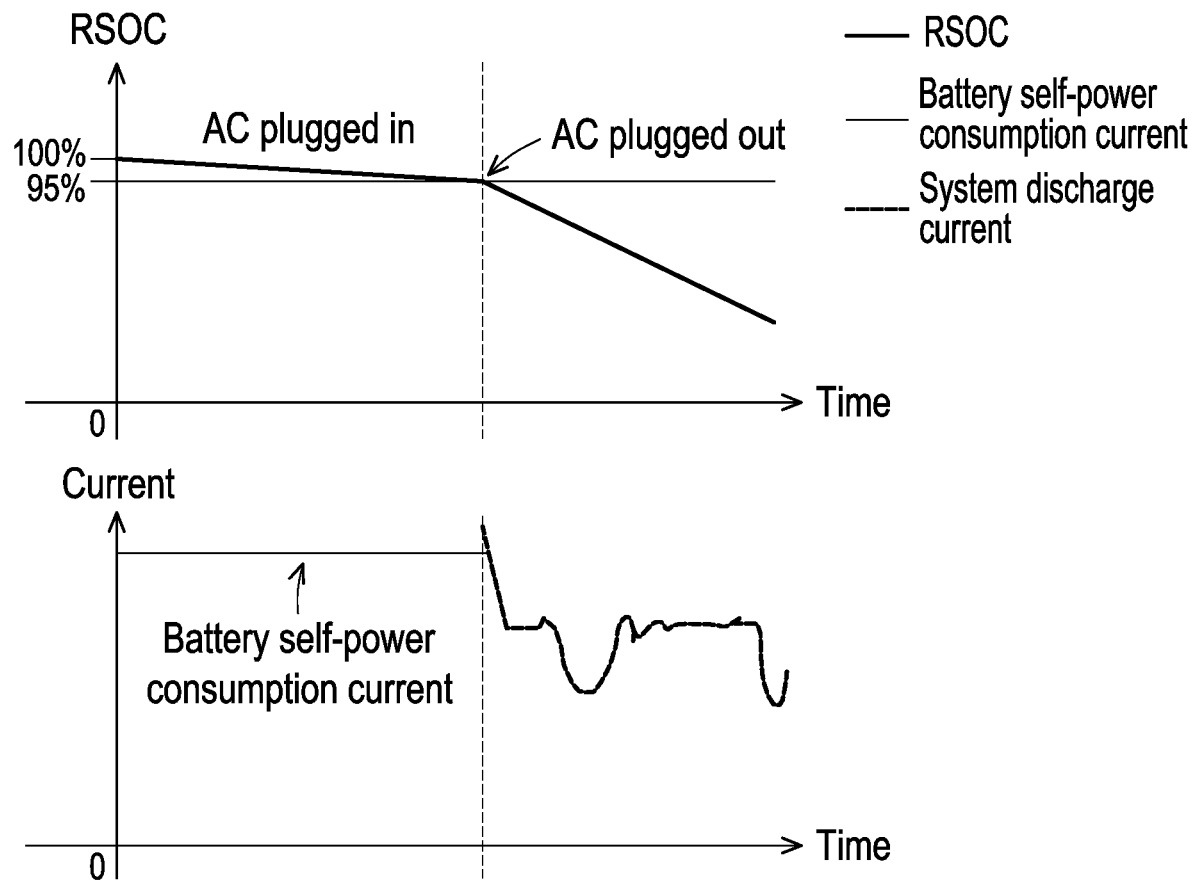
FIG. 5 is a diagram of a battery power consumption state according to an embodiment of the disclosure.

For example, FIG. 5 is a diagram of a battery power consumption state according to an embodiment of the disclosure. As shown in a battery power consumption state diagram 50 of FIG. 5, when AC power is present (i.e., the AC adaptor is plugged in), the system is basically powered by the AC power, and the battery enters a self-power consumption state after the RSOC reaches 100%. When the RSOC of the battery reaches 95% and the AC adaptor is unplugged, the battery is used to supply power to the system at this time, and the capacity of the battery decreases as an accumulated amount of system discharge current increases. If the AC power is still plugged in at this time, the AC power charges the battery.

In step S306, the processor 26 calculates a first average value of multiple self-power consumption times recorded within a preset period from a current time, and compares the first average value with a second average value of the self-power consumption times of a previous preset period of the preset period. The preset period ranges from one week to three months, but the embodiment is not limited thereto.

In detail, as can be seen from the embodiment of FIG. 5, in the presence of AC power, the battery is self-consuming during a period from 100% to 95% of the RSOC value. By calculating the self-power consumption period and obtaining the average value of the self-power consumption period using simple moving average (SMA) method, a basis for adjusting the load of the electronic apparatus may be obtained. Since it is not possible to charge to 100% of RSOC every day in a single month, only data of a month in which this condition is reached is used to calculate the self-power consumption time.

If a month is used as a benchmark, an average value of the self-power consumption time $SMA_x$ in an $x^{th}$ month is calculated as follows.

$$SMA_x = \frac{t1 + t2 + t3 + \ldots tn}{n}$$

t1 to tn are the self-power consumption times calculated when the RSOC drops from 100% to 95% in the $x^{th}$ month, where n is a positive integer.

In step S308, the processor 26 adjusts a value of a power limit for controlling the electronic apparatus 20 to enter a load adjusting state according to a comparison result. According to one embodiment, the processor 26 adjusts the value of the power limit, for example, when a ratio of the first average value to the second average value is less than a preset ratio. The preset ratio has a value, for example, between 80% and 95%, and adjusting the value of the power limit is, for example, multiplying the power limit by the preset ratio or subtracting the preset value, and the embodiment does not limit the adjusting method.

According to one embodiment, the processor 26 adjusts, for example, at least one of four power limits PL1 to PL4 currently set for a system on a chip (SoC). PL1 is an average power, a value of which is close to the thermal design power (TDP), and the processor 26 is allowed to remain at this power level all the time. PL2 is higher than PL1. The processor 26 may be allowed to maintain operation at power of PL2 for. e.g. 100 seconds, and general boost is in the PL2 state. PL3 is a higher level, and the processor 26 may be allowed to remain at power of PL3, for e.g. 10 milliseconds. PL4 is an upper power limit, and the processor 26 is not allowed to exceed this power limit, which means that when system power consumption is about to exceed the power limit of PL4, the system will immediately down load, but the processor may maintain 10 milliseconds of power discharge between PL2 and PL4.

Figure 6:
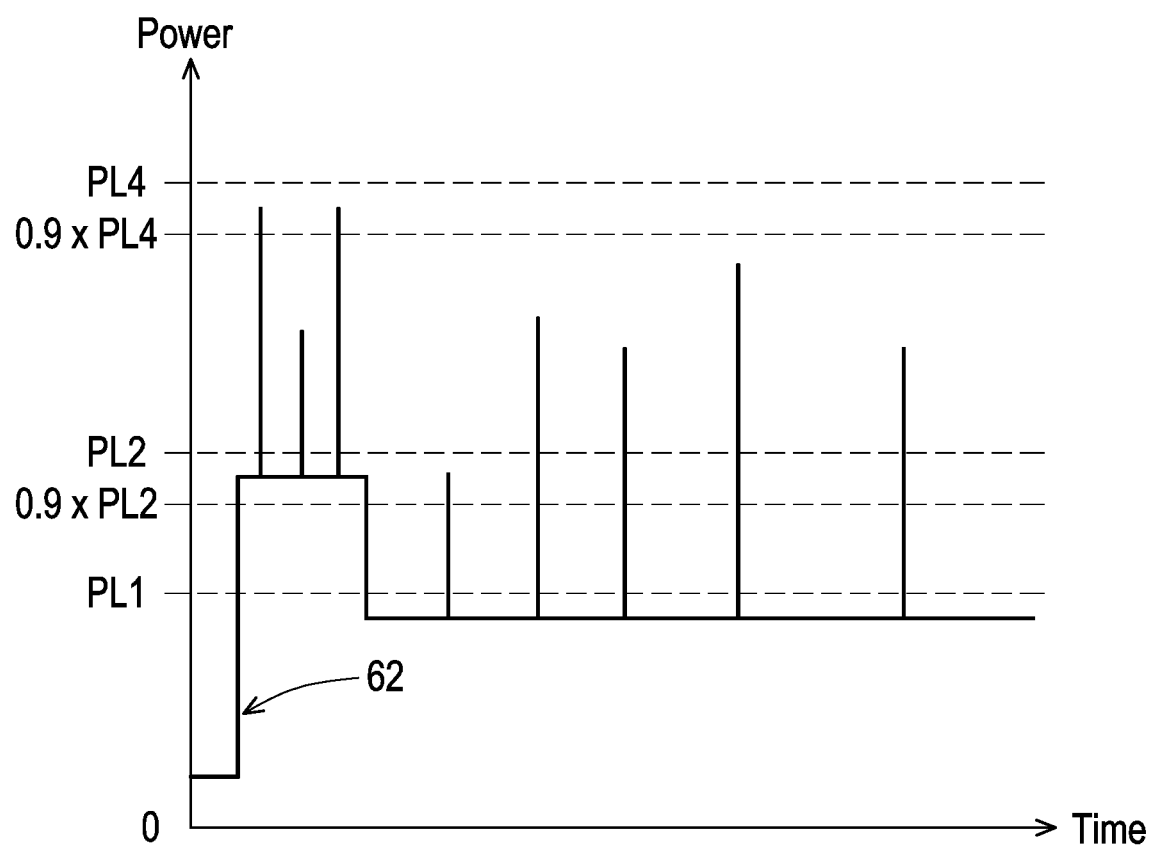
FIG. 6 is a schematic diagram of a power limit for adjusting an electronic apparatus to enter a load adjusting state according to an embodiment of the disclosure.

For example. FIG. 6 is a schematic diagram of a power limit for adjusting an electronic apparatus to enter a load adjusting state according to an embodiment of the disclosure. Referring to FIG. 6, in a system power variation diagram 60 according to this embodiment, waveform 62 shows variation of system power consumption, and PL1, PL2, and PL4 are, for example, the power limits set for the system on a chip. PL1 is the power limit for normal system power consumption. Since the system power consumption generates different peak power depending on the hardware configuration, the embodiment sets higher power limits PL2 and PL4 respectively for this condition.

It should be noted that as the battery ages, its discharge capacity deteriorates. In this case, if the system still maintains the same load, the battery may enter power-off protection due to battery overload, which will cause the system to shut down instantly. Therefore, according to this embodiment, when a ratio of a SMA value calculated in the latest month to a SMA value calculated in a previous month drops to less than or equal to 90%, the system adjusts the power limits PL2 and PL4 by a 10% downward adjustment. This is equivalent to setting the battery to age by 10%, and the discharge capacity also decreases by 10%, such as an adjusted power limits of 0.9×PL2 and 0.9×PL4. By lowering the power limit, when the system power consumption increases, the system may adjust the load earlier (i.e., down load) to avoid shutdown due to battery overload.

In summary, the electronic apparatus and the load adjusting method thereof according to the embodiment of the disclosure are able to detect battery aging early and make appropriate adjustments by continuously monitoring, recording and counting the self-power consumption time required for battery self-power consumption, thus preventing the system from shutting down due to the battery overload. The method according to this embodiment may be realized by modifying a battery management system (BMS) of the battery and software/firmware of an embedded controller (EC), which may ensure that the system will not experience instantaneous power failure, the user will not noticeably feel the reduction in performance, and the protection of the battery will not be compromised.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A load adjusting method of an electronic apparatus, applicable to an electronic apparatus with a processor and a battery, the method comprising:
    detecting powering of an external power supply;
    calculating and recording a self-power consumption time of the battery from a full capacity to a preset capacity when the powering of the external power supply is detected;
    calculating a first average value of a plurality of self-power consumption times recorded within a preset period from a current time, and comparing the first average value with a second average value of the self-power consumption times of a previous preset period of the preset period; and
    adjusting a value of a power limit for controlling the electronic apparatus to enter a load adjusting state when a ratio of the first average value to the second average value is less than a preset ratio.

2. The load adjusting method of the electronic apparatus according to claim 1, wherein the external power supply is an AC adaptor, and detecting the powering of the external power supply comprises:
    detecting a connection of the AC adaptor by using a detection pin in a jack on the electronic apparatus for connecting the AC adaptor, wherein when electric potential of the detection pin changes from high to low, the powering of the external power supply is determined to be detected.

3. The load adjusting method of the electronic apparatus according to claim 1, wherein the preset period ranges from one week to three months.

4. The load adjusting method of the electronic apparatus according to claim 1, wherein the preset ratio has a value between 80% and 95%.

5. An electronic apparatus comprising:
    a battery to power the electronic apparatus;
    a storage device to store computer programs; and
    a processor coupled to the battery and the storage device, and configured to load and execute the computer programs to:
    detect powering of an external power supply;
    calculate a self-power consumption time of the battery from a full capacity to a preset capacity and record the self-power consumption time in the storage device when the powering of the external power supply is detected;
    calculate a first average value of a plurality of self-power consumption times recorded within a preset period from a current time, and compare the first average value with a second average value of the self-power consumption times of a previous preset period of the preset period; and
    adjust a value of a power limit for controlling the electronic apparatus to enter a load adjusting state when a ratio of the first average value to the second average value is less than a preset ratio.

6. The electronic apparatus according to claim 5 further comprising:
a jack, comprising a detection pin for connecting an AC adaptor, wherein
the processor detects a connection of the AC adaptor by using the detection pin, and determines the powering of the external power supply is detected when electric potential of the detection pin is detected to change from high to low.

7. The electronic apparatus according to claim 5, wherein the preset period ranges from one week to three months.

8. The electronic apparatus according to claim 5, wherein the preset ratio has a value between 80% and 95%.

* * * * *